June 7, 1932.  C. R. CLAGHORN  1,861,840
CONVEYER
Filed Aug. 10, 1928   2 Sheets-Sheet 1
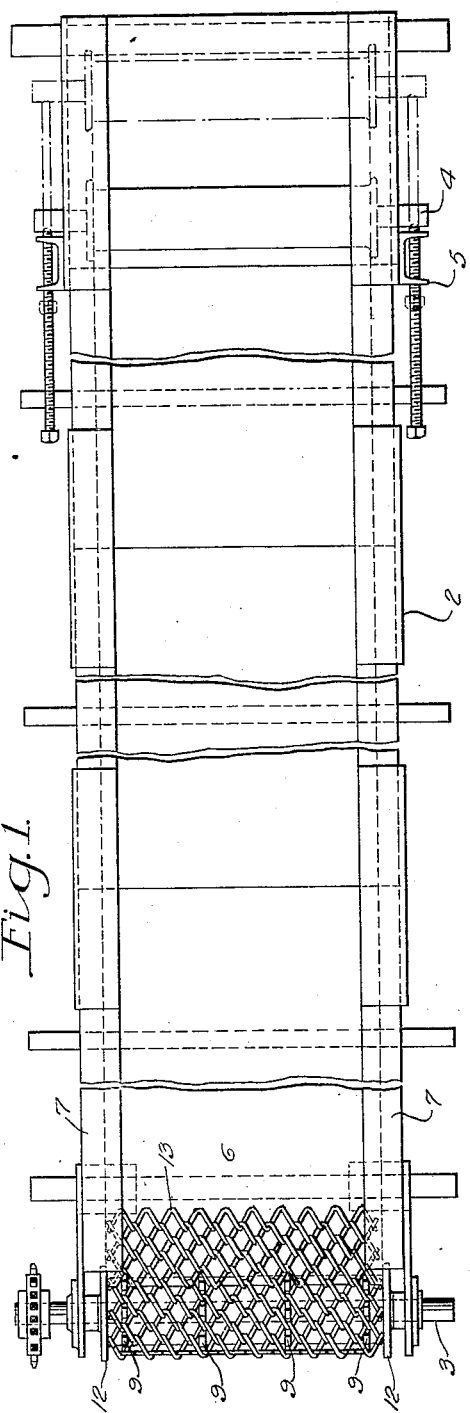
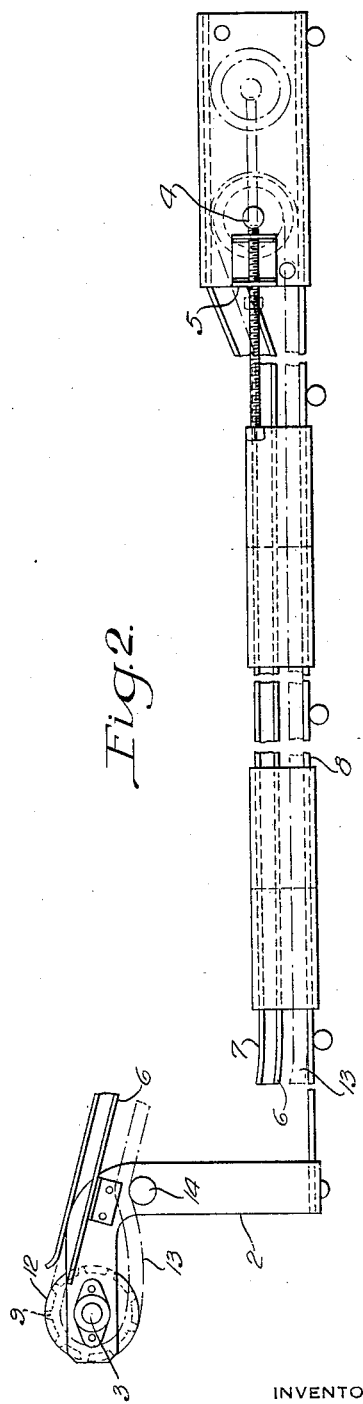
INVENTOR
Clarence R. Claghorn
by Byrnes, Stebbins & Parmelee
his attorneys June 7, 1932.  C. R. CLAGHORN  1,861,840
CONVEYER
Filed Aug. 10, 1928   2 Sheets-Sheet 2

INVENTOR
Clarence R. Claghorn
by Byrnes, Stebbins & Parmelee
his attorneys

Patented June 7, 1932

1,861,840

UNITED STATES PATENT OFFICE

CLARENCE R. CLAGHORN, OF BALTIMORE, MARYLAND

CONVEYER

Application filed August 10, 1928. Serial No. 298,832.

This invention relates broadly to conveyers and more particularly to a driving means for conveyers having a substantially continuously movable conveying element. It relates still more particularly to conveyers having conveying elements having interstices therein into which a driving means is adapted to penetrate to drive the conveyer.

Conveyers for conveying solid substances such, for example, as coal, slate, dirt and the like, which are provided with conveying elements having interstices therein, and which, for example, may comprise a wire mesh or a mesh of metal ribbon, have heretofore been known. These conveyers are quite generally of the type embodying an endless conveying element and in such case are usually driven by a rotary driving means engaging the conveying element at either one or both of its edges, usually at a portion specially adapted to be engaged by the driving means.

Conveyers of the type above mentioned have been attended with numerous disadvantages. Among these disadvantages is the fact that the conveying element, being inherently more or less resilient by reason of its mesh construction, has had a tendency to be pulled out of its normal alignment by the driving means which engage it at its edges. Furthermore, a great strain is placed on the conveying element due to the fact that the entire weight of the material being conveyed rests thereon between its edges, and the driving force is exerted thereon at the edges. There is also a considerable loss in power because the driving means is not fully effective, acting as it does only at the edges of the conveying element.

I provide a conveyer having a conveying element and driving means for the conveying element having portions penetrating the material supporting portion thereof. I have found that particularly when a conveying element of open work or mesh construction is used it is desirable to engage the conveying element at spaced points transversely thereof in order to more evenly distribute the driving force over the width of the conveying element. This is very easily accomplished with a conveying element having interstices therein as the driving means finds a natural bearing in the interstices of the conveying element and no special provision need be made in this regard.

I provide a conveyer having a conveying element provided with a material supporting portion and a sprocket drive for the conveying element, the sprocket teeth penetrating the material supporting portion thereof. Endless conveying elements have heretofore been sprocket driven, but the sprocket has engaged merely the edge of the conveying element or a sprocket chain fastened to the conveying element at one or both edges. By providing a plurality of sprockets arranged on a driven shaft extending transversely of the conveying element, such sprockets being adapted to engage the conveying element at spaced points transversely thereof, I have produced a conveyer drive having distinct advantages over those heretofore known.

I further provide a conveyer having a conveying element and driving means for the conveying element spaced transversely thereof, and means permitting relative transverse movement of the driving means. A conveying element of mesh construction is inherently more or less resilient, as above mentioned, and if fixed sprockets were provided they would tend to place a stress upon the conveying element and would also tend to ride out of the meshes thereof and consequently to drive the element unevenly. By providing sprockets which are relatively movable transversely of the conveying element these disadvantages are eliminated.

In the accompanying drawings I have shown a present preferred embodiment of the invention wherein Figure 1 is a top plan view of a conveyer with portions cut away;

Figure 2 is a side elevation of the conveyer shown in Figure 1;

Figure 3:
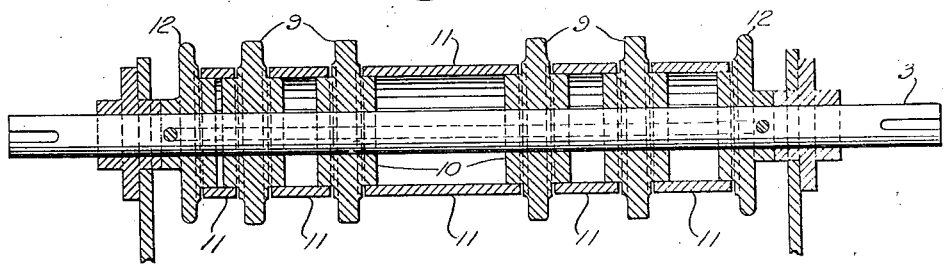
Figure 3 is a section through the sprockets and the driving shaft.

Referring more particularly to the drawings, reference numeral 2 designates generally a frame in which is journalled a driving shaft 3. Also journalled in the frame 2 is a shaft 4 suitably mounted on take-up mechanism 5 of usual construction. Extending longitudinally of the frame is an apron 6 to which are fastened guides 7 and 8 for a conveying element.

Referring more particularly to Figure 3, the shaft 3 is provided with keyed-on sprockets 9. These sprockets are slidable longitudinally of the shaft while always remaining in driven relationship thereto. Each sprocket 9 is provided with oppositely disposed hubs 10 extending axially therefrom. Between each pair of sprockets is a sleeve 11 of somewhat less length than the distance between adjacent sprocket teeth but of greater length than the distance between the inside portions of the hubs. The sleeves 11 fit over the hubs 10 of the sprockets 9 and thus adjustably limit the axial movement of the sprockets on the shaft 3. The sleeves and hubs are so positioned that even though all of the sprockets are pushed in one direction on the shaft the last sleeve will still remain in place over the hubs so that there is no possibility of any sleeve losing its engagement with the sprockets. Guide members 12 are also provided on the shaft 3 for guiding the conveying element at its edges.

A wire mesh conveying element 13 is provided which extends around the shafts 3 and 4 and is adapted to be driven by the sprockets 9. The sprocket teeth engage the interstices within the wire mesh and bear against the sides thereof to effect the driving of the conveying element. By reason of the fact that a number of sprockets are provided which are spaced transversely of the conveying element, the driving force imparted thereto is distributed thereover so as to relieve the conveying element of undue strain.

Furthermore, by reason of the limited adjustment of the sprockets on the shaft they may move axially of the shaft to accommodate themselves to the interstices in the wire mesh. Thus a very effective drive is provided which moves the conveying element without placing any undue stresses upon it and at the same time provides greater power than when the conveying element is driven merely at its edges.

The conveying element surrounds the apron 6 and is guided by the guides 7 and 8 so as to remain in place as it is operated. An anti-friction means 14 is provided for supporting the conveying element as it passes from the sprocket to the guide 8. The shaft 4 may be provided with individual sprockets corresponding to the sprockets 9 on the shaft 3 or it may have merely a cylindrical bearing member for the conveying element. It is preferable to provide sprockets although this is not essential inasmuch as the driving force is imparted to the conveying element entirely by the shaft 3 through the sprockets 9.

Figure 4:
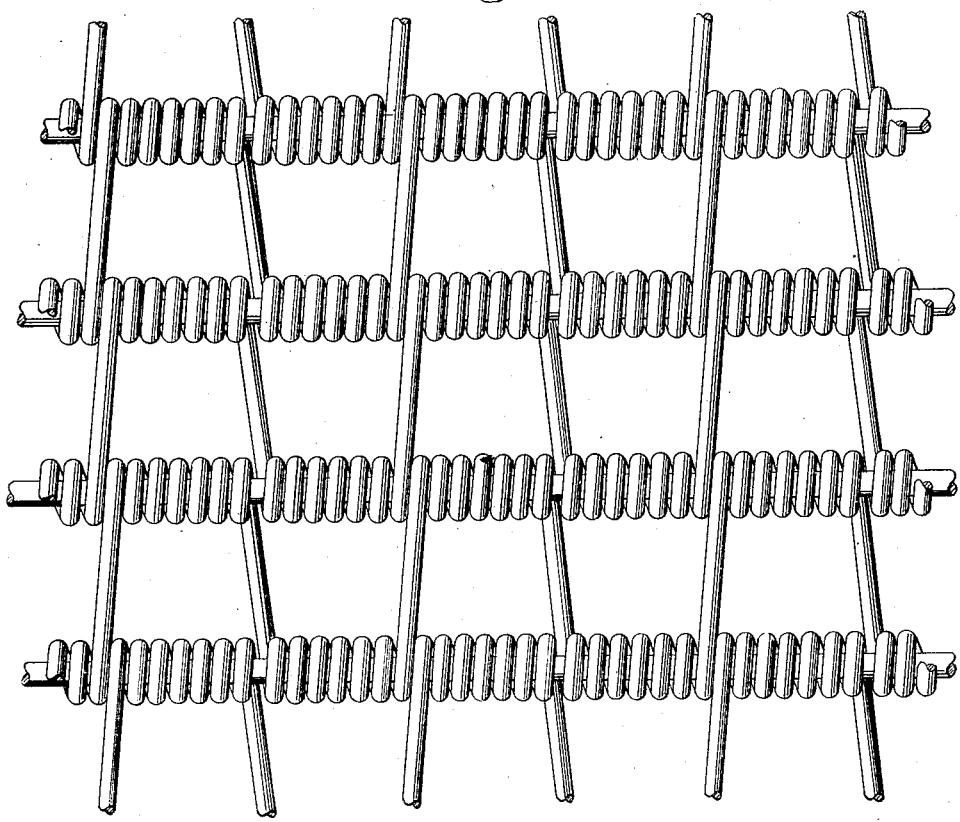
Figure 4 is a detail view of one form of conveying element which is adapted to be used with my invention.

In Figure 4 is shown a modified form of wire mesh conveying element which is well adapted for use with my invention. If a conveying element such as that shown in Figure 4 is used the adjusting sleeves 11 may be dispensed with inasmuch as there is little likelihood of the wire mesh being pulled out of alignment as is the case with a mesh of the type shown in Figure 1. It is, however, desirable to provide the sleeves in order to guard against emergencies when the wire mesh might break or become disengaged.

While I have shown and described a present preferred embodiment of the invention, it is to be understood that the same is not limited thereto but may be otherwise embodied within the scope of the following claims:

I claim:

1. In a conveyer, a conveying element, and driving means therefor spaced transversely thereof, the driving means being relatively movable transversely of the conveying element.

2. In a conveyer, a mesh conveying element, and driving means engaging the meshes of the conveying elements at spaced points transversely thereof, the driving means being relatively transversely movable to enable the same to adjust their respective positions in accordance with the meshes of the conveying element.

3. In a conveyer, a conveying element, and sprockets engaging the conveying element at spaced points transversely thereof, the sprockets being movable transversely to adjusted positions relative to the conveying element.

4. In a conveyer, a conveying element, a driving shaft extending transversely of the conveying element, and driving members on the shaft engaging the conveying element at spaced points transversely thereof, the driving members being movable transversely to adjusted positions relative to the conveying element.

5. In a conveyer, a conveying element, driving sprockets arranged transversely of the conveying element to engage it at spaced points, and members interposed between the respective driving sprockets and permitting limited relative transverse movement thereof to adjusted positions relative to the conveying element.

6. In a conveyer, a conveying element, a driving shaft disposed transversely thereof, driving members on the shaft engaging the conveying element at spaced points transversely thereof, and adjusting sleeves on the shaft interposed between the respective driving members permitting limited relative transverse movement thereof to adjusted positions relative to the conveying element.

7. In a conveyer, a conveying element, a driving shaft disposed transversely thereof, driving members on the shaft engaging the conveying element at spaced points transversely thereof, the driving members having hubs, and sleeves interposed between the respective driving members, fitting over the hubs, and permitting limited relative transverse movement of the driving members.

8. In a conveyer, a mesh conveying element, and transversely disposed sprockets engaging the meshes of the conveying element for driving it, such sprockets being transversely adjustable to accommodate themselves to the meshes of the conveying element.

9. In a conveyer, a mesh conveying element, and transversely disposed adjustable sprockets engaging the meshes of the conveying element for driving it and arranged to accommodate themselves to such meshes.

In testimony whereof I have hereunto set my hand.

CLARENCE R. CLAGHORN.